(12) United States Patent
Sekine

(10) Patent No.: US 7,767,289 B2
(45) Date of Patent: *Aug. 3, 2010

(54) INSERT-MOLDED ARTICLE, PRODUCTION METHOD OF THE INSERT-MOLDED ARTICLE AND INK

(75) Inventor: Yoshinori Sekine, Tokyo (JP)

(73) Assignee: Teikoku Printing Inks Mfg. Co., Ltd., Tokyo (JP)

( * ) Notice: Subject to any disclaimer, the term of this patent is extended or adjusted under 35 U.S.C. 154(b) by 1352 days.

This patent is subject to a terminal disclaimer.

(21) Appl. No.: 10/702,312

(22) Filed: Nov. 6, 2003

(65) Prior Publication Data

US 2004/0213965 A1    Oct. 28, 2004

(30) Foreign Application Priority Data

Nov. 13, 2002    (JP) .............................. 2002-329934

(51) Int. Cl.
*B41M 5/00*    (2006.01)
(52) U.S. Cl. ................. 428/195.1; 428/431; 264/297.2; 264/459; 264/494; 264/129; 264/132; 106/31.13
(58) Field of Classification Search ................. 264/129, 264/132
See application file for complete search history.

(56) References Cited

U.S. PATENT DOCUMENTS

| 5,437,926 | A  | * | 8/1995 | Takahashi et al. ............ 428/332 |
| 5,480,726 | A  | * | 1/1996 | Richart ........................ 428/482 |
| 6,509,097 | B1 | * | 1/2003 | Hatakeyama et al. ........ 428/412 |
| 6,682,679 | B1 | * | 1/2004 | Marentic et al. ............. 264/247 |
| 6,733,870 | B2 | * | 5/2004 | Enlow et al. ................. 428/207 |
| 6,933,044 | B2 | * | 8/2005 | Ishikawa ...................... 428/323 |

FOREIGN PATENT DOCUMENTS

| JP | 8-3502       |   | 1/1996 |
| JP | 2001-19885   |   | 1/2001 |
| JP | 2001164163   | * | 6/2001 |
| JP | 2001-249793  |   | 9/2001 |
| JP | 2004-2629    |   | 1/2004 |

\* cited by examiner

*Primary Examiner*—Mark Ruthkosky
*Assistant Examiner*—Tamra L. Dicus
(74) *Attorney, Agent, or Firm*—Jordan and Hamburg LLP

(57) ABSTRACT

An insert-molded article and a production method of the insert-molded article are provided which highly satisfy all the requirements indispensable for the insert-molding. The insert-molded article 6 comprises a film 1 having transparency, a thermosoftening decorative print layer 2 printed on the backside of the film 1 by use of a crosslinking printing ink for the purpose of visual observation from the front surface side of the film, a binder layer 3 printed on the thermosoftening decorative print layer 2 by use of a low-crosslinking printing ink or a non-crosslinking printing ink, and a synthetic resin 5 molded by injection on the binder layer 3.

12 Claims, 2 Drawing Sheets

(THE INJECTION-MOLDING STEP)

(THE FIRST PRINTING STEP)

(THE SECOND PRINTING STEP)

(THE FORMING STEP)

(THE INJECTION-MOLDING STEP)

INSERT-MOLDED ARTICLE, PRODUCTION METHOD OF THE INSERT-MOLDED ARTICLE AND INK

BACKGROUND OF THE INVENTION

1. Field of the Invention

The present invention relates to an insert-molded article, a production method of the insert-molded article, and an ink.

2. Description of the Related Art

Nowadays, insert-molded articles have come to be used, for example, in various indicator boards and housings of cellular phones, and display parts and operational parts of household electric appliances. In the production of these insert-molded articles, at the beginning, a decorative printing is made on the backside of a transparent film, generally for the purpose of protecting a printed layer, with a colored ink containing resin components such as polycarbonate, to be observed from the front side of the film. As the next step, the film on which the above-described decorative print layer is formed is processed into the surface shape of a molded article. Furthermore, the film having the surface shape of the above described molded article is inserted into a mold with the decorative print layer facing inside, then a melted resin is injected to the above described decorative print layer side, and the injected resin and the above described film are made to be integrated. An insert-molded article is thereby completed which is constituted with a transparent film, a decorative print layer and an injected resin, and in which printing is made so as the printed matter to be visually observable from the front surface side of the transparent film.

As described above, the production process of an insert-molded article is generally composed of the printing step, forming step and injection-molding step. It is an indispensable requirement in the printing step that <1> the adhesion between the film and the printed ink is sufficiently strong and the adhesion is maintained through the whole steps. Additionally, it is another indispensable requirement in the forming step that <2> the printed ink can be extended following the extension of the film caused by heating so that no crack and no exfoliation from the film occur. Additionally, it is another indispensable requirement in the injection-molding step that <3> the decorative print layer is not fluidized and swept away caused by the flow of the high temperature melted resin being injected, and <4> when the melted resin having been injected is cooled and solidified, the cooled and solidified resin and the ink on decorative print layer are made to strongly adhere to each other.

Any of these indispensable requirements <1> to <4> is a requirement of the ink for use in printing the decorative print layer. Accordingly, as the ink for use in printing the decorative print layer, inks have been proposed in which various types of polycarbonate resins are contained as the resin component (Japanese Patent Laid-Open No. 8-3502, Japanese Patent Laid-Open No. 2001-19885, Japanese Patent Laid-Open No. 2001-249793). However, even when the decorative print layer is formed by using the inks containing the polycarbonate resins as the resin component, the adhesion between the film and the ink involved in the indispensable requirement <1> can be obtained sufficiently in the case where the film to be printed contains polycarbonate, but the adhesion is not necessarily sufficient in the case where the printing film is made of polyethylene terephthalate, polyurethane or the like. Furthermore, as far as the indispensable requirements <2> to <4> are concerned, the interrelationship found between these requirements is such that when any one of these requirements is satisfied, the other requirements are not satisfied, and thus, it has been hardly possible to highly satisfy all the indispensable requirements <1> to <4>.

Accordingly, an object of the present invention is to provide an insert-molded article and a production method of the insert-molded article, which are able to highly satisfy all the requirements that become indispensable in the insert-molding. Additionally, another object of the present invention is to provide a various types of inks to be used for that purpose.

SUMMARY OF THE INVENTION

For the purpose of overcoming the above described problems, the present invention provides an insert-molded article wherein the article comprises a film having transparency, a thermosoftening decorative print layer, for visual observation from the front surface side of the film, printed on the backside of the film by use of a crosslinking printing ink, a binder layer printed on the thermosoftening decorative print layer by use of either a low-crosslinking printing ink or a non-crosslinking printing ink, and a resin injected on the binder layer.

Additionally, the present invention provides a production method of the insert-molded article of the present invention. The production method comprises, the first printing step using a crosslinking ink on the backside of a transparent film to form a thermosoftening decorative layer to form a thermosoftening decorative print layer for visual observation from the front side of the film; a second printing step to form a binder layer by printing with either a low-crosslinking printing ink or a non-crosslinking printing ink on a thermosoftening decorative print layer; a forming step of the film, on which the above described thermosoftening decorative print layer and binder layer have been formed by the above described printing steps, into the predetermined surface shape of an insert-molded article; and a injection-molding step of inserting the above described shaped film processed by the forming step to a mold with the above described thermosoftening decorative print layer facing inside, and injecting a melted resin onto the above described binder layer side in the mold, and integrating the injected resin and the above described film.

Furthermore, the present invention provides an ink for use in production of an insert-molded article, which is a crosslinking printing ink or a low-crosslinking printing ink used in the production method of the above described insert-molded article, characterized in that the ink is a two-pack type ink which is composed of an ink component comprising as the resin component a polyester resin having hydroxy groups and a crosslinking agent component comprising a multifunctional isocyanate compound as the crosslinking agent; and additionally the present invention provides an ink for use in the production method of an insert-molded article which is a non-crosslinking ink to form the above described binder layer in the production method of the above described insert-molded article, characterized in that the ink contains at least one or more types of resins selected from vinyl chloride polymer (copolymer), (metha)acrylic resin and polyester resin.

Accordingly, in the printing steps, a thermosoftening decorative print layer, for visual observation from the front surface side, is applied on the backside of a transparent film by printing with a crosslinking ink, and additionally a binder layer is applied on the thermosoftening decorative print layer by printing with either a low-crosslinking printing ink or a non-crosslinking printing ink. In this case, the thermosoftening decorative print layer is applied by printing with a crosslinking printing ink, and hence the sufficient adhesion between the film and the ink can be obtained in cooperation with the choice of the resin component in the crosslinking printing ink (the indispensable requirement <1>) Additionally, the sufficient adhesion between the thermosoftening decorative print layer formed by printing with such a crosslinking printing ink and the binder layer formed by printing with either a low-crosslinking printing ink or a non-crosslinking printing ink can be obtained.

In the following forming step, the film applied with the thermosoftening decorative print layer and the binder layer on the backside is heat softened, and thus processed into a predetermined surface shape of a molded article by means of the press molding, vacuum molding, pneumatic molding and the like. In this case, the thermosoftening decorative print layer is provided by printing with a crosslinking printing ink, but is thermosoftening, and hence the ink in the thermosoftening decorative print layer is extended following the film being extended by heating so that no crack and no peeling from the film of the thermosoftening decorative print layer occur (the indispensable requirement <2>). Additionally, the sufficient adhesion between the thermosoftening decorative print layer formed by printing with a crosslinking printing ink and the binder layer formed by printing with either a low-crosslinking printing ink or a non-crosslinking ink can be obtained, and hence the binder layer is also extended by following the thermosoftening decorative print layer.

Furthermore, in the following injection-molding step, the film is inserted into a mold with the thermosoftening decorative print layer facing inside, and a melted resin is injected onto the side of the above described thermosoftening decorative print layer, namely, on the binder layer. In this case, the thermosoftening decorative print layer is as described above provided by printing with a crosslinking printing ink, thus not fluidized by the high temperature melted resin being injected, and additionally protected by the binder layer so as to be fixed in a more stable manner (the indispensable requirement <3>).

Furthermore, in the injection-molding step, the injected resin is cooled and solidified to be integrated with the above described film. In this case, what the injected resin directly contacts is the binder layer which is formed by printing with either a low-crosslinking printing ink or a non-crosslinking printing ink, and hence the binder layer and the cooled and solidified resin adhere strongly to each other. Additionally, as described above, the sufficient adhesion between the thermosoftening decorative print layer formed by printing with a crosslinking printing ink and the binder layer formed by printing with either a low-crosslinking printing ink or a non-cross-linking printing ink is obtained. Accordingly, the injected, cooled and solidified resin is made to adhere strongly to the thermosoftening decorative print layer through the intermediary of the binder layer (the indispensable requirement <4>).

Incidentally, if the ink for the binder layer printed on the above described thermosoftening decorative print layer has transparency, it is preferable because the binder layer does not affect the decorability of the thermosoftening decorative print layer when visual observation of the thermosoftening decorative print layer is made from the front surface side of the film.

As a further more detailed description of the present invention, the film having transparency used in the present invention is frequently used as being formed in a shape of an insert-molded article, and hence it is preferable that the film is a thermoplastic film suitable for that purpose. Additionally, because the film is required to have heat resistance and durability, a film made of polycarbonate resin, polyethylene terephthalate resin or a blend resin containing these resins is most preferably used.

The film surface is generally flat and smooth, but the film can have a surface roughened for the purpose of being imparted a mat appearance to such an extent that the transparency of the film is not lost. The thickness of the film can be appropriately selected according to the object, and a film of the order of 80 to 800 nm in thickness, in particular, of the order of 100 to 500 µm in thickness is generally used.

In the next place, a thermosoftening decorative print layer is applied on the backside of the above-described film. In the present invention, as an ink for use in printing the thermosoftening decorative print layer, a two-pack ink is used which comprises an ink component containing a thermoplastic resin having functional groups and a crosslinking agent component to react with the above described functional groups to generate crosslinked structures Selection of the ink materials is made on the basis of the following test as the standard. At first, an ink component to be used and a crosslinking agent are mixed together, and the mixture obtained is coated on a sheet of release coated paper, the solvent is evaporated under the condition of 80° C. and 2 hours or more, and thus a film of about 10 µm in thickness is produced. Then, the film is stored stand at 30° C. for 20 days to promote the crosslinking reaction to a sufficient extent. A part of the film thus obtained is soaked in cyclohexane for 30 minutes at room temperature and it is confirmed that the film is not completely dissolved. Furthermore, a part of the above described film is cut out in strips, and the strips are subjected to tensile test at 20° C. and 80° C. where the elongation before breaking at 80° C. is confirmed to be larger than the elongation before breaking at 25° C.

A combination of crosslinking ink materials that pass the above-described two confirmation points is judged to be appropriate for forming the thermosoftening decorative print layer of the present invention.

Specific examples of the appropriate material include preferable thermoplastic resins having functional groups such as polyester resin containing hydroxy groups, polyurethane resin containing hydroxy groups and poly(meth)acrylic resin containing hydroxy groups. Among these resins, the polyester resin containing hydroxy groups is particularly preferable. This is because the polyester resin containing hydroxy groups is satisfactory in adhesion both to polycarbonate resin film and to polyethylene terephthalate resin film in common, and various types of the resins concerned are commercially available so that a resin appropriate to the present invention can be easily selected. In other words, polyester resin is produced by the condensation reaction between an acid and an alcohol conducted by use of, as the acid component, phthalic acid, isophthalic acid, terephthalic acid, adipic acid and various fatty acid derived from natural fats; as alcoholic components, ethyleneglycol, propyleneglycol, 1, 4-butanediol, 1,6-hexanediol and the like; furthermore as the alcohol for introducing hydroxy groups, glycerin, trimethylolpropane, trimethylolethane, pentaerythritol and the like: thus, aplenty of possible combinations of the raw materials make it easy to perform a variety of molecular designs. Accordingly, it is extremely easy to select a resin among the commercially available resins that is necessary to meet the indispensable requirements <1> to <4>, which are required to be satisfied by the decorative ink for use in the insert-molding.

Examples of the commercially available resins, preferable as the resin component in the ink for use in decoration of an insert-molded article, include Vylon 200, 220, 240, 300, 500 and GK250 manufactured by Toyobo Co., Ltd., Nichigo polyester TP-220, LP-033, SP-170 and SP-154 manufactured by Nippon Synthetic Chemical Industry Co., Ltd., and DYNAPOL L411, L850 and LH812 manufactured by Dynamite Nobel Co., Ltd. (Germany).

It has been discovered that even when these resin components are selected, these resins alone cannot yield an ink for use in decoration which satisfies the indispensable requirements <1> to <3> for insert-molding, but the concomitant use of multifunctional isocyanate compounds, which generate crosslinking structure by slowly reacting with the hydroxy groups of the polyester resin, is necessary.

Examples of the multifunctional isocyanate compound include Sumidur N-75, N3200, N3300, HT, and Desmodur Z4470, HL manufactured by Sumitomo Bayer Urethane Co., Ltd.; Coronate HX, HL, 2298-90H, 2094, 2096 manufactured by Nippon Polyurethane Industry Co., Ltd.; and Takenate 110, 160N, 500, 600, 700 manufactured by Takeda Badische Urethane Industries, Ltd.

The crosslinking printing ink for use in formation of the thermosoftening decorative print layer of the present invention is produced, as described above, by mixing together, in advance of printing, the ink component containing the resin component having functional groups and the crosslinking agent component to form crosslinking structure by reacting with the functional groups.

Furthermore, the crosslinking printing ink for use in formation of the thermosoftening decorative print layer contains various types of coloring agents. The coloring agents include white pigments, black pigments and other various color pigments. Additionally, special pigments can include a light-accumulating pigment; pigments emitting light when exposed to the ultraviolet light such as a BL pigment, a fluorescent pigment, a holographic pigment, a pearl pigment; an alumina flake pigment coated with a metal oxide; a silica flake pigment coated with a metal oxide; and a liquid crystal pigment which is composed of a three-dimensional oriented crosslinked material having a chiral phase. A detailed description on these special pigments is found in the specification of Japanese Patent Application No. 2002-280771.

In the production of the insert-molded article of the present invention, the thermosoftening decorative print layer, applied for the purpose of visual observation from the film surface side, is formed by making a desired printing on the backside of the film having transparency by use of the crosslinking printing ink, blended as described above, for use in decoration; a colored crosslinking printing ink is frequently printed, for the purpose of imparting the concealability, on a decorative printing ink layer formed by printing with a pigment weak in concealability. Different colors are sometimes printed in a partially overlapped manner so that no voids between the figure patterns may be generated. Additionally, for the case of a pigment displaying the sparkling (glittering) property among the above described pigments exemplified as special pigments, such a pigment sometimes cannot display its own intrinsic performance if a black and/or a white decorative crosslinking printing ink is not printed in a manner overlapping the sparkling ink printing, and accordingly the decorative crosslinking printing ink is frequently printed in multiple layers.

In the case where a transparent portion is desired to be applied on the insert-molded article of the present invention, no decorative crosslinking printing ink is printed on that portion as the case may be, and accordingly the decorative crosslinking printing ink is not necessarily always printed all over the film surface. Additionally, in the case where a portion in the insert-molded article does not need so high abrasion resistance, the decorative crosslinking printing ink is printed directly on the film surface of that portion as the case may be.

Yet additionally, in the case where a sufficiently thick thermosoftening decorative print layer is formed by printing the decorative crosslinking ink on the first decorative print layer in a superposing manner, the first decorative print layer may be formed with a non-crosslinking ink.

Additionally, it is preferable that the thermosoftening decorative print layer is generally set at a thickness per a layer of the order of 1 to 10 μm. Accordingly, the application of the screen printing method is preferable because a printing layer adjusted to fall within the above described thickness range can be easily obtained by the screen printing method; other printing methods can also be applied.

In the next place, description will be made on the ink for formation of the binder layer; the binder layer is required to exhibit satisfactory adhesion both to the thermosoftening decorative print layer formed by printing with a crosslinking ink and to the melted resin that has been injection molded. The application of a low-crosslinking printing ink and a non-crosslinking ink has been found effective for that purpose. In the present invention, by the low-crosslinking ink it is meant that when the low-crosslinking ink is subjected to the film formation and crosslinking under the same requirements as those applied to the crosslinking printing ink for use in formation of the thermosoftening decorative print layer, the obtained film of the former has a larger cyclohexane swelling than the film of the latter. The most familiar examples of the low-crosslinking printing ink can include an ink in which reduced is the amount of the crosslinking agent used in the crosslinking ink for use in formation of the thermosoftening decorative print layer. Examples of the resins used in the non-crosslinking ink can include vinyl chloride-vinyl acetate copolymer, (meth) acrylic resin, polyester resin and the mixtures thereof. The particularly preferable examples can include vinyl chloride-vinyl acetate copolymer and the blend resins containing thereof as the main component. The ink for use in formation of the binder ink is printed on a transparent portion free of decorative printing in some case, and exudes into the transparent portion by thermal fluidization in some other case. Accordingly, it is preferable that the binder layer is transparent, and particularly has colorless transparency.

It is generally preferable that the binder layer is 1 to 10 μm in thickness, and accordingly it is preferable that the binder layer is also formed by the screen-printing. However, the thickness and the printing method thereof can be other than those described above without any problem.

DETAILED DESCRIPTION OF THE PREFERRED EMBODIMENTS

Figure 3:
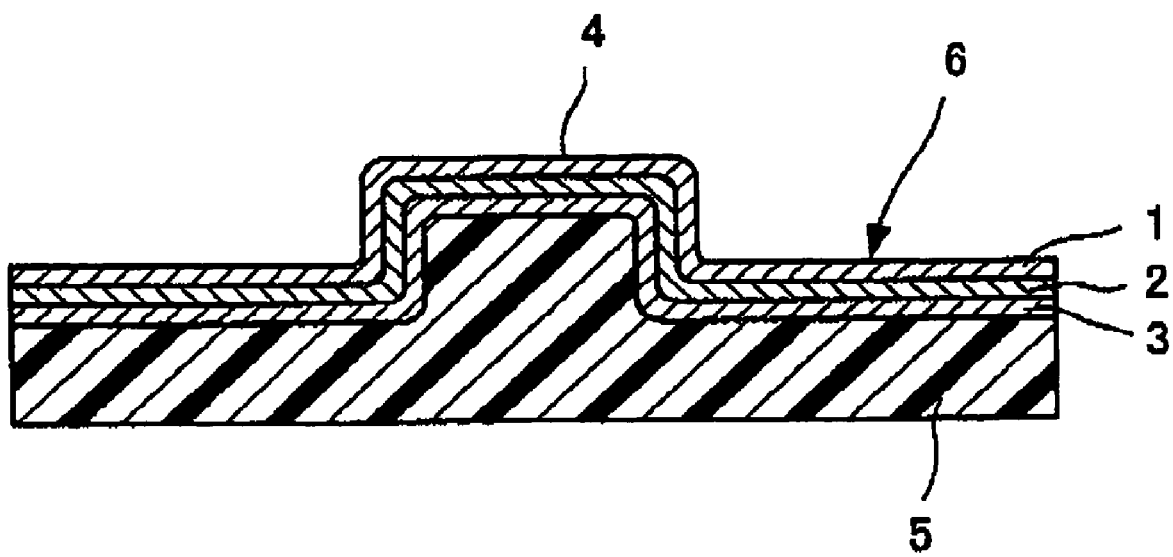
FIG. 3 is a schematic sectional view illustrating the injection-molding step and a molded article.

Description will be made below on an embodiment of the present invention with reference to the drawings. As FIG. 3 shows, the present embodiment is the one involving the production of a molded article 6 which has a convex portion 4 in the central region.

Figure 1A:
FIG. 1 shows the schematic sectional views illustrating the printing step in an embodiment of the present invention.

At the beginning, in a first printing step, as FIG. 1(a) shows, a transparent film 1 is prepared which is made of a heat resistant film such as polycarbonate film, polyethylene terephthalate film and the like all having transparency. Then, a crosslinking printing ink A comprising the below described composition is printed by the screen printing method on the backside of the transparent film 1, to form a thermosoftening decorative print layer 2.

| Crosslinking printing ink A | |
|---|---|
| Ink | |
| Coloring pigment (Mitsubishi carbon MA100) | 8 parts by weight |
| Polyester polyol resin (Vylon 200) | 25 parts by weight |
| Cyclohexanone | 35 parts by weight |
| Aromatic hydrocarbon based solvent | 30 parts by weight |
| Additive | 2 parts by weight |
| Crosslinking agent | |
| Isocyanate based crosslinking agent (Coronate 2096) | 10 parts by weight |

The thermosoftening decorative print layer 2 formed by the first printing step is provided by printing the above described crosslinking printing ink, and hence a sufficient adhesion between the transparent film 1 and the printed ink is obtained (the indispensable requirement <1>).

Figure 1B:
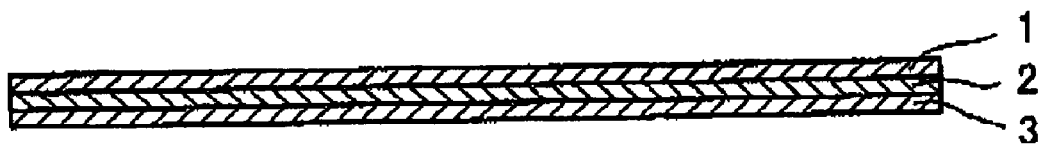

In the next place, in a second printing step, as FIG. 1(*b*) shows, a transparent low-crosslinking printing ink B or a transparent non-crosslinking printing ink C or D, respectively comprising the below described compositions, is printed on the thermosoftening decorative print layer 2, to form a binder layer 3.

| Low-crosslinking printing ink B | |
|---|---|
| Ink | |
| Fine powder silica | 8 parts by weight |
| Polyester polyol resin (Vylon 200) | 25 parts by weight |
| Cyclohexanone | 37 parts by weight |
| Aromatic hydrocarbon based solvent | 31 parts by weight |
| Additive | 2 parts by weight |
| Crosslinking agent | |
| Isocyanate based crosslinking agent (Coronate 2096) | 5 parts by weight |

| Non-crosslinking printing ink C | |
|---|---|
| Fine powder silica | 5 parts by weight |
| Vinyl chloride-vinyl acetate copolymer (Denka vinyl 1000 MT2) | 20 parts by weight |
| Cyclohexanone | 40 parts by weight |
| Aromatic hydrocarbon based solvent | 33 parts by weight |
| Additive | 2 parts by weight |
| Non-crosslinking printing ink D | |
| Fine powder silica | 5 parts by weight |
| Methacrylic resin (Paraloid All) | 25 parts by weight |
| Cyclohexanone | 35 parts by weight |
| Aromatic hydrocarbon based solvent | 33 parts by weight |
| Additive | 2 parts by weight |

A sufficient adhesion can be obtained between the binder layer 3 formed by printing with the low-crosslinking printing ink B, or the non-cross-linking printing ink C or D and the thermosoftening decorative print layer formed by printing with the cross-linking printing ink.

Figure 2:
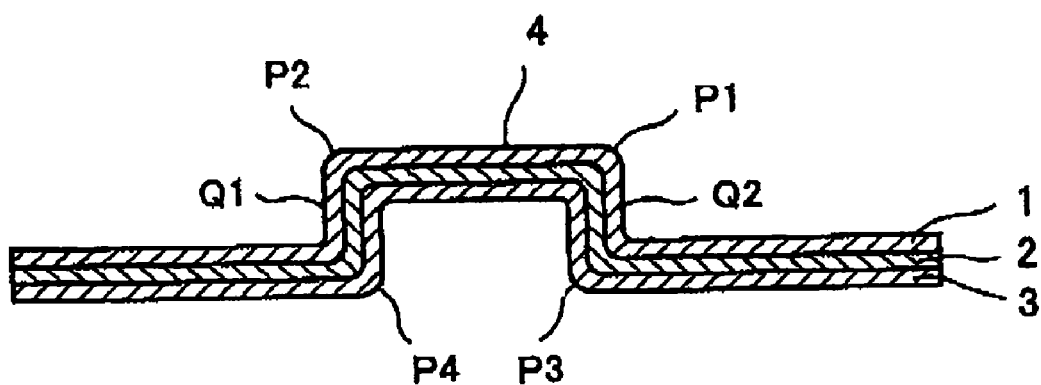
FIG. 2 is a schematic sectional view illustrating the forming step in the same embodiment.

Furthermore, in the forming step, as FIG. 2 shows, the transparent film, on which the above described thermosoftening decorative print layer 2 and the binder layer 3 are formed, is subjected to the forming stepping, for example, by means of the hot plate type vacuum pneumatic molding method, to form a convex portion 4. In this case, even if the transparent film 1 is stretched in the standing up portions Q1, Q2, the thermosoftening decorative print layer 2 is heated and stretched concomitantly following the stretching transparent film 1, and accordingly no crack is generated in the thermosoftening decorative print layer 2 and no exfoliation thereof from the transparent film 1 is caused (the indispensable requirement <2>). Additionally, the sufficient adhesion is obtained between the thermosoftening decorative print layer 2 formed by printing with the crosslinking printing ink A and the binder layer 3 formed by printing with the low-crosslinking printing ink B or the non-crosslinking printing ink C or D, and hence neither crack nor fracture has been found in the crooked portions P1, P2, P3, P4 in both printing layers 2, 3.

Additionally, in the final injection-molding step, the transparent film 1 having been subjected to the forming step is fixed to the mold with the backside thereof, on which the thermosoftening decorative print layer 2 and the binder layer 3 are formed, facing to the inside, and then, as FIG. 3 shows, a thermally melted synthetic resin 5 (polycarbonate resin, ABS resin, (meth) acrylic resin, styrene (co) polymer resin, or the like) is injected into the above described mold. In this case, the thermosoftening decorative print layer 2 is provided by printing with the crosslinking printing ink, as described above, and accordingly is not fluidized concomitantly following the flow of the high temperature resin being injected (the indispensable requirement <3>).

Thereafter, the injected resin is cooled and solidified to be integrated with the transparent film 1. In this case, what the injected resin directly contacts is the binder layer 3 formed by printing with the low-crosslinking printing ink or the non-crosslinking printing ink, and the binder layer 3 and the cooled and solidified synthetic resin 5 strongly adhere to each other. Additionally, as described above, a sufficient adhesion is obtained between the thermosoftening decorative print layer 2 formed by printing with the crosslinking printing ink and the binder layer 3 formed by printing with the low-crosslinking printing ink or the non-crosslinking printing ink. Accordingly, the injected synthetic resin 5 that has been cooled and solidified is made to adhere strongly to the thermosoftening decorative print layer 2 through the intermediary of the binder layer 3 (the indispensable requirement <4>).

Additionally, by releasing the mold when the synthetic resin 5 has been cooled and solidified, the molded article 6 is completed which has a convex portion 4 in the central region as shown in the figure. Thus the molded article 6 can be obtained in which when the molded article 6 is observed from the outside, the thermosoftening decorative print layer 2 can be visually observed through the transparent film 1, and neither crack nor fracture is found in the above described portions Q1, Q2, P1, P2, P3, and P4 (see FIG. 2).

Incidentally, in the present embodiment, an object having a convex portion 4 is shown as the molded article, but the present invention, needless to say, can be applied to molded objects having more complicated concave and convex shapes and the like or flat plate like molded articles.

As described above, according to the present invention, the insert-molded article and the production method of the insert-molded article can be provided that can satisfy the four requirement becoming indispensable for the insert-molding, namely, <1> the adhesion between the film and the printed ink;

<2> the requirement that the ink on the thermosoftening decorative print layer is stretched following the film that is heated and stretched, and accordingly neither crack generation nor exfoliation from the film occurs;

<3> the requirement that the thermosoftening decorative print layer is not fluidized concomitantly following the flow of the high temperature melted resin being injected; and <4> the requirement that when the injected melted resin is cooled and solidified, the cooled and solidified resin and the ink on the thermosoftening decorative print layer adhere strongly to each other.

What is claimed is:

1. An insert-molded article, comprising a film having transparency, a thermosoftening decorative print layer printed by use of a crosslinking printing ink on the backside of said film for the purpose of visual observation from the front surface side of said film, a binder layer printed on said thermosoftening decorative print layer by use of a low-crosslinking printing ink or a non-crosslinking printing ink as the source of said binder layer, and a resin molded by injection on said binder layer.

2. The insert-molded article according to claim 1, wherein said thermosoftening decorative print layer contains as the resin component, a crosslinked polyester resin.

3. The insert-molded article according to claim 1, wherein said binder layer contains as the resin component a low-crosslinking resin component that has a crosslinking degree lower than the crosslinking degree of the resin component constituting said thermosoftening decorative print layer.

4. The insert-molded article according to claim 2, wherein said binder layer contains as the resin component a low-crosslinking resin component that has a crosslinking degree lower than the crosslinking degree of the resin component constituting said thermosoftening decorative print layer.

5. The insert-molded article according to claim 1, wherein said binder layer contains as the resin component one or more types of resins selected from vinyl chloride (co) polymer, (meth) acrylic resin and polyester resin.

6. The insert-molded article according to claim 2, wherein said binder layer contains as the resin component one or more types of resins selected from vinyl chloride (co) polymer, (meth) acrylic resin and polyester resin.

7. The insert-molded article according to claim 1, wherein said binder layer has transparency.

8. The insert-molded article according to claim 2, wherein said binder layer has transparency.

9. The insert-molded article according to claim 3, wherein said binder layer has transparency.

10. The insert-molded article according to claim 4, wherein said binder layer has transparency.

11. The insert-molded article according to claim 5, wherein said binder layer has transparency.

12. The insert-molded article according to claim 6, wherein said binder layer has transparency.

* * * * *